(12) United States Patent
Neith (10) Patent No.: US 8,244,117 B2
(45) Date of Patent: Aug. 14, 2012

(54) PHOTO MOTION MACHINE AND SYSTEM

(76) Inventor: Jack D. Neith, Shamong, NJ (US)

( * ) Notice: Subject to any disclaimer, the term of this patent is extended or adjusted under 35 U.S.C. 154(b) by 15 days.

(21) Appl. No.: 12/930,682

(22) Filed: Jan. 13, 2011

(65) Prior Publication Data

US 2012/0183284 A1    Jul. 19, 2012

(51) Int. Cl.
*G03B 15/00* (2006.01)
*G03B 17/00* (2006.01)
*G03B 19/00* (2006.01)

(52) U.S. Cl. ............. 396/1; 396/2; 396/3; 396/4; 396/5

(58) Field of Classification Search ............... 396/1–5, 396/248, 428; 248/126–200; 428/429; 345/419
See application file for complete search history.

(56) References Cited

U.S. PATENT DOCUMENTS

| | | | | |
|---|---|---|---|---|
| 4,729,536 A * | 3/1988 | Scala | .................. | 248/429 |
| 5,857,119 A * | 1/1999 | Borden | .................. | 396/5 |
| 6,088,527 A * | 7/2000 | Rybczynski | .................. | 396/1 |
| 7,394,977 B2 * | 7/2008 | Park et al. | .................. | 396/5 |
| 7,440,685 B2 * | 10/2008 | Weng | .................. | 396/5 |
| 7,453,456 B2 * | 11/2008 | Petrov et al. | .................. | 345/419 |
| 2003/0128975 A1 * | 7/2003 | Shevick | .................. | 396/428 |
| 2006/0147188 A1 * | 7/2006 | Weng | .................. | 396/5 |
| 2007/0172216 A1 * | 7/2007 | Lai | .................. | 396/5 |

* cited by examiner

*Primary Examiner* — Clayton E LaBalle
*Assistant Examiner* — Kevin Butler
(74) *Attorney, Agent, or Firm* — Stuart M. Goldstein (57) ABSTRACT

A photo motion system utilizes a camera mounted photo motion machine in conjunction with a rotating turntable. The photo motion machine uses a vertically moveable carriage which supports a tilt table platform on which a digital camera is mounted. The carriage itself is mounted on columns which extend upward from a moveable, wheeled base member. Once the object to be photographed is properly positioned on the turntable, a computer software program is initiated which simultaneously coordinates the rotation of the turntable, the tilting movement of the camera, the vertical up and down movement of the carriage, the fore and aft movement of the base member, and the photographic image taking timing of the camera to take a series of images at predetermined positions during the movement of the camera on a specific arcuate route of travel around and over the object. The images are ultimately downloaded from the camera and arranged in sequential order to create an animated video.

15 Claims, 7 Drawing Sheets

PHOTO MOTION MACHINE AND SYSTEM

BACKGROUND OF THE INVENTION

Photo motion is the process of photographing an object multiple times, in series, while the object continually changes position. The resulting photographic images are then arranged sequentially. When the images are viewed in rapid succession, the object appears to move. The smaller the increments between the taking of the photographic images during the movement of the object, the more natural the animated moving object appears as the images are sequentially run.

Photo motion processes are currently being used to exhibit products on internet websites. A series of photographic images are manually taken of different side views of a product. These images are then aligned sequentially and run in succession to provide the appearance that the product is rotating. The process is flawed and produces inconsistent results in that images at critical vantage points are missed and views are lost. Such techniques result in animations which skip or show haltingly moving images of the rotating product. They also cannot accurately present the top, or even perspective views of the product.

Taking video images of moving products presents its own disadvantages. Most notably, the viewer cannot pause and zoom in on a location while watching a video. As a practical matter, video taping all views of a continuously moving product to create a smooth video reproduction, is difficult and expensive, requiring excessive man-hours to accomplish.

SUMMARY OF THE INVENTION

It is thus the object of the present invention to address the limitations and disadvantages of existing photo motion systems.

It is the object of the present invention to provide a photo motion machine and system which efficiently and expeditiously creates continuous, smooth, video images showing all elevation and top views of an object.

It is another object of the present invention to provide a photo motion machine and system which provides total control of the positioning of the viewed object by permitting the viewer to move the object to any position, to zoom into and move the object towards and away from the viewer, and to pause at any view at any time to examine a specific feature of the object.

It is still another object of the present invention to provide a photo motion machine and system which provides for a relative small file of images which can be loaded and viewed on smart phones, as well as on the internet.

It is another object of the present invention to provide a photo motion machine and system which eliminates the working man hours, with its attendant expense, otherwise necessitated by a professional photographer, since the system is totally computer controlled, requiring that no personnel be present once the process begins.

It is a further object of the present invention to provide a photo motion machine and system which permits the presentation of photo motion images of an object of any size, limited only by the size of the system's turntable which is used.

These and other objects are accomplished by the present invention, a photo motion system which utilizes a camera mounted photo motion machine in conjunction with a rotating turntable. The photo motion machine uses a vertically moveable carriage which supports a tilt table platform on which a digital camera is mounted. The carriage itself is mounted on columns which extend upward from a moveable, wheeled base member. Once the object to be photographed is properly positioned on the turntable, a computer software program is initiated which simultaneously coordinates the rotation of the turntable, the tilting movement of the camera, the vertical up and down movement of the carriage, the fore and aft movement of the base member, and the photographic image taking timing of the camera to take a series of images at predetermined positions during the movement of the camera on a specific arcuate route of travel around and over the object. The images are ultimately downloaded from the camera and arranged in sequential order to create an animated video.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Photo motion machine system 1 of the present invention comprises photo motion machine 2 used in conjunction and simultaneously with turntable 4. Photo motion machine 2 is coordinated to move in conjunction with turntable 4 and the object 200 to be photographed, as will be described hereinafter.

Figure 3:
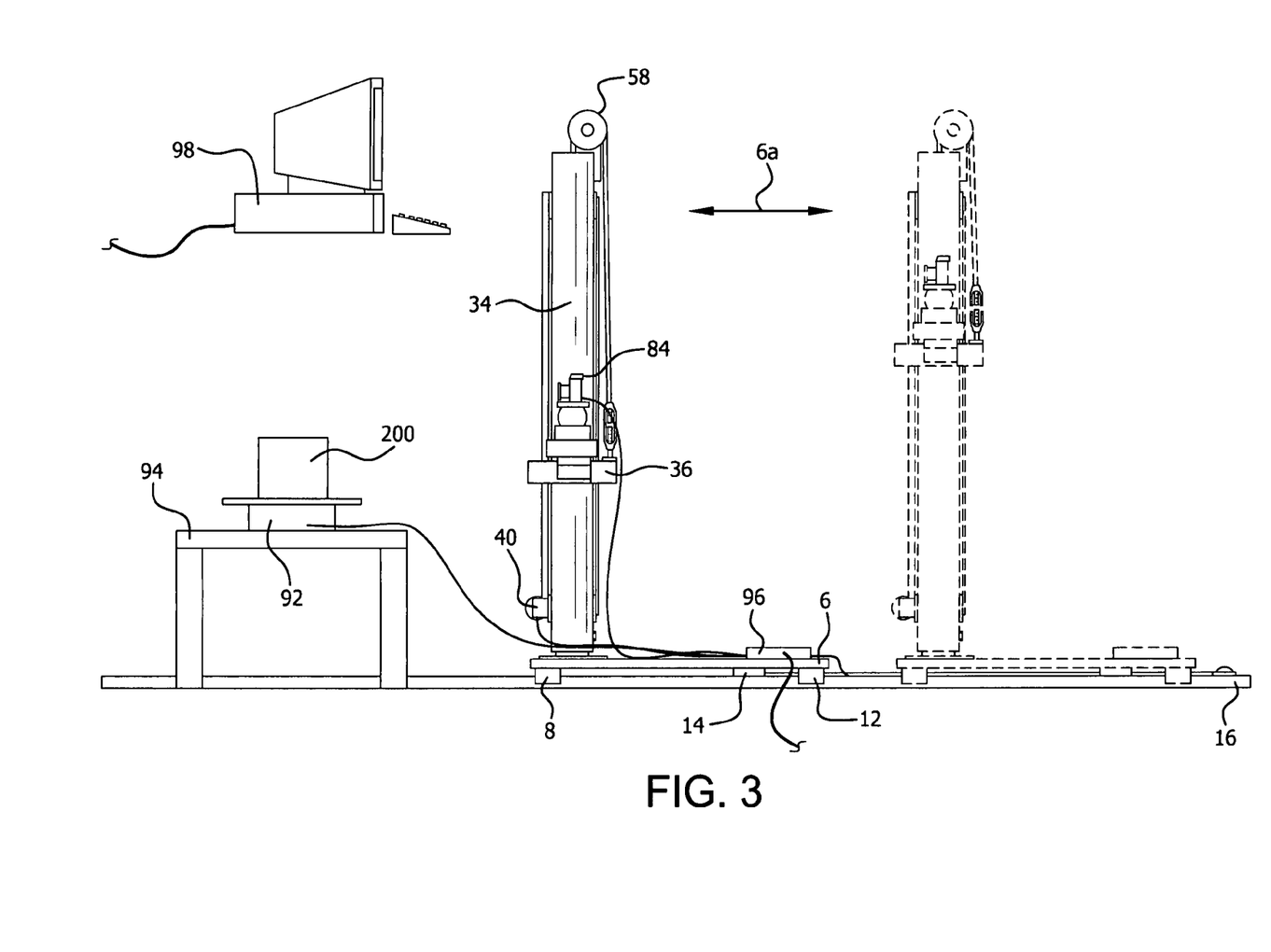
FIG. 3 is an elevation view of the photo motion machine system of the present invention.

Photo motion machine 2 comprises base or platform member 6 having slideable supports 8, 10, 12, and 14 which ride over frame members 18 and 20 of framework 16. Wheels can be utilized in lieu of slideable supports 8, 10, 12, and 14. Framework 16 also comprises center frame member 22. All three frame members are secured at their respective ends to cross frames 24 and 26. The underside of base member 6 is secured to horizontal transport unit 28 which itself is connected to electric motor 30 which provides the power to the transport unit to move base member 6 fore and aft 6a over framework 16. See FIG. 3.

Dual hollow posts 32 and 34 extend upward from and are supported by base member 6. Posts 32 and 34 extend completely through vertically moveable carriage 36 which surrounds both the posts. Vertical transport rail 38 is located between posts 32 and 34 and is secured at its lower end to electric motor 40, which itself is supported on bottom, forward cross plate 42 connected to the posts, and at its upper end to top, forward cross plate 44. Vertical transport unit 46, driven by electric motor 40, moves carriage 36 vertically along vehicle transport rail 38 and posts 32 and 34. Wheels 64, 66, 68, 70, 72 and 74, all secured to internal surfaces of carriage 36, assist in the smooth movement of the carriage along posts 32 and 34.

Figure 1:
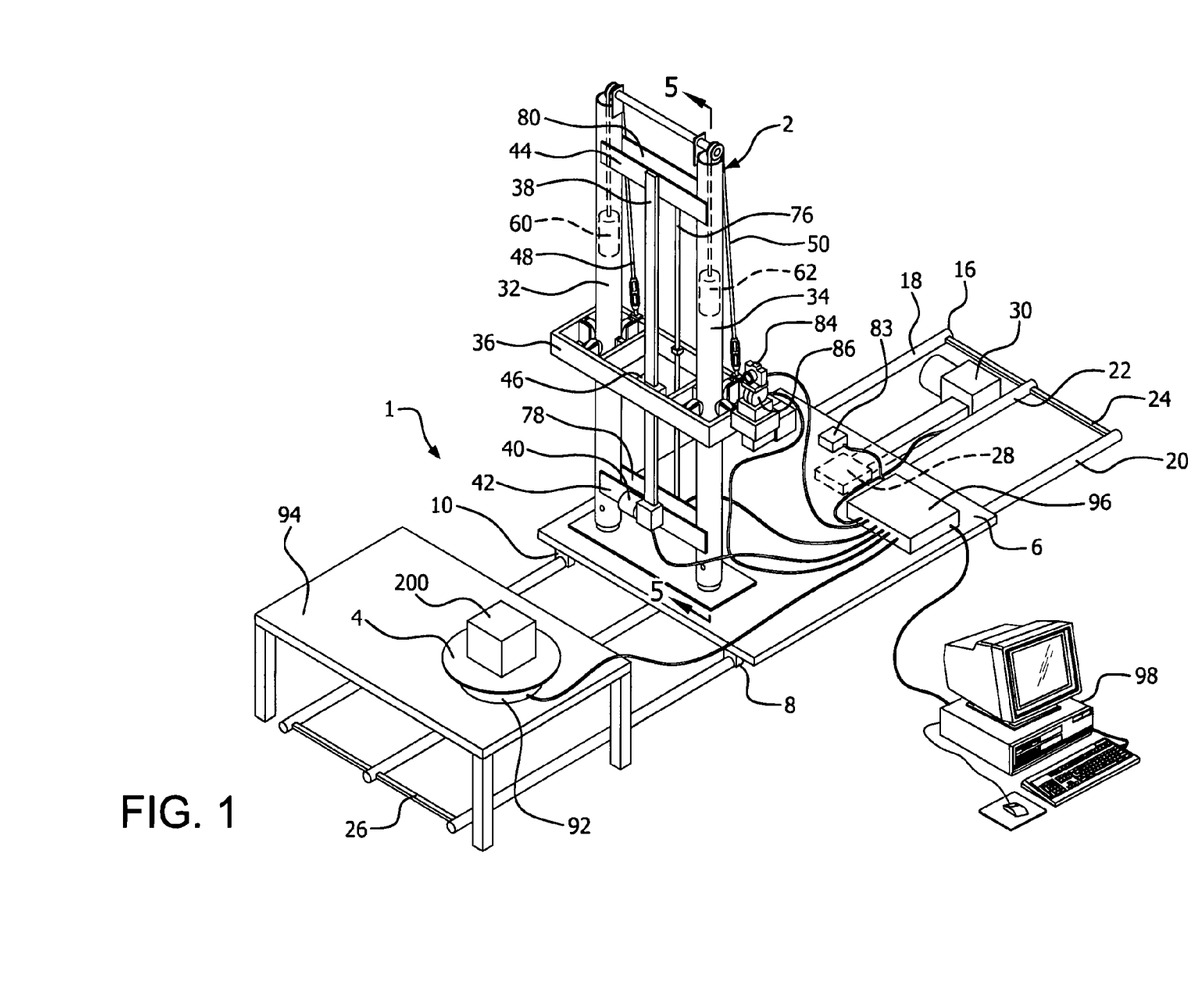
FIG. 1 is a perspective view of the photo motion machine system of the present invention.
Figure 2:
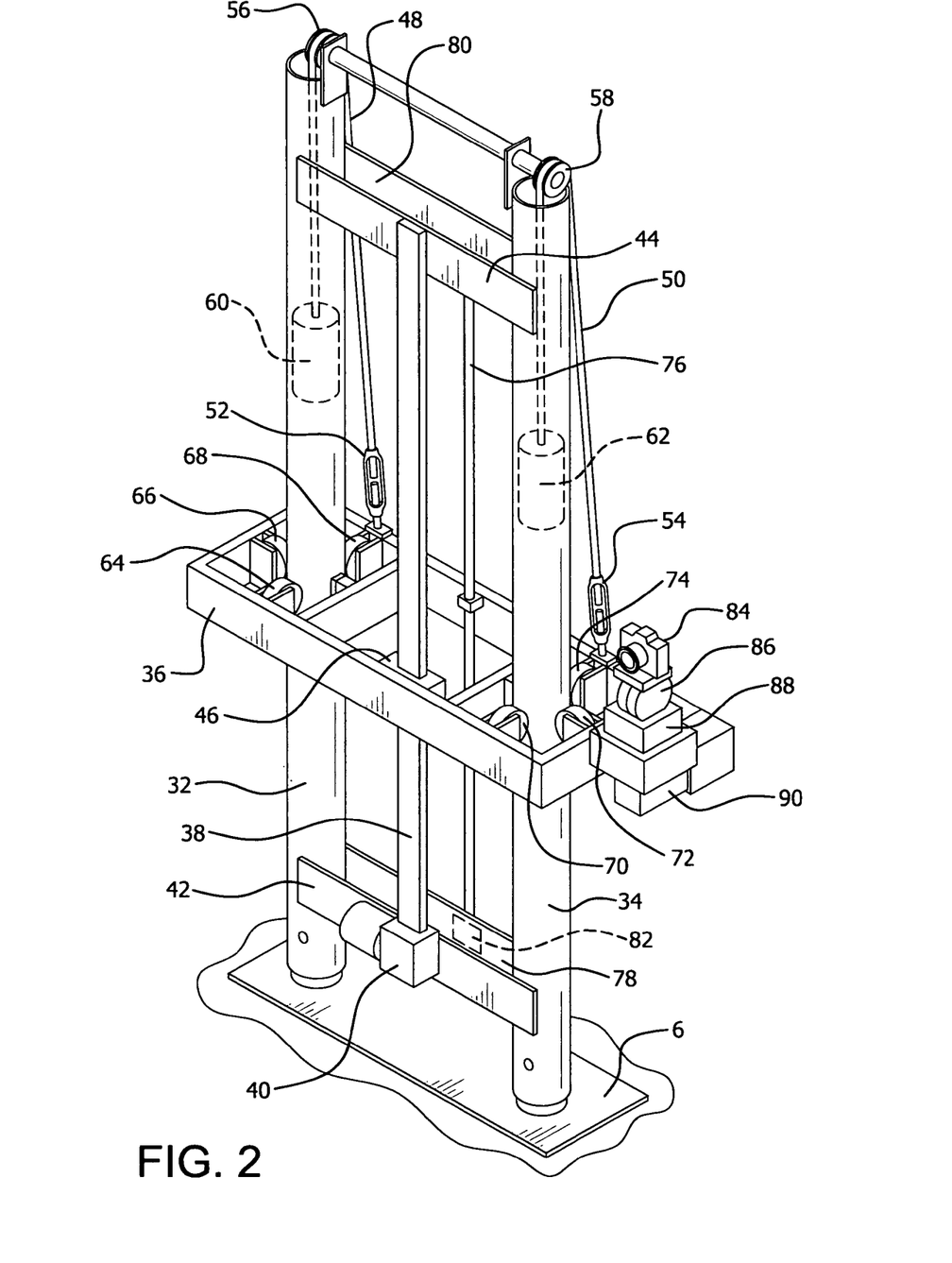
FIG. 2 is a perspective view of the vertical post/carriage/camera component of the photo motion machine system of the present invention.
Figure 5:
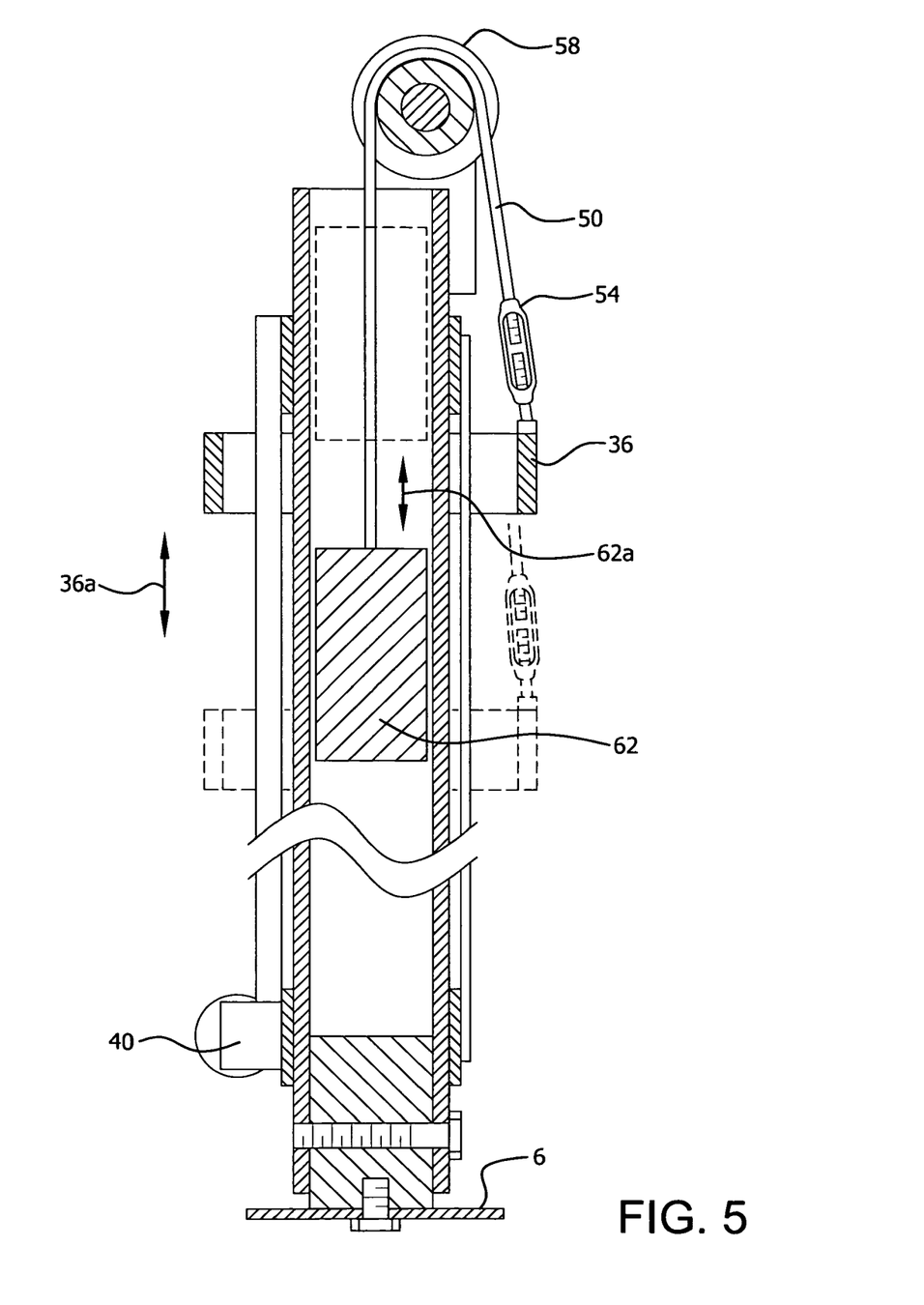
FIG. 5 is a cross-sectional view taken from FIG. 1.
Figure 6:
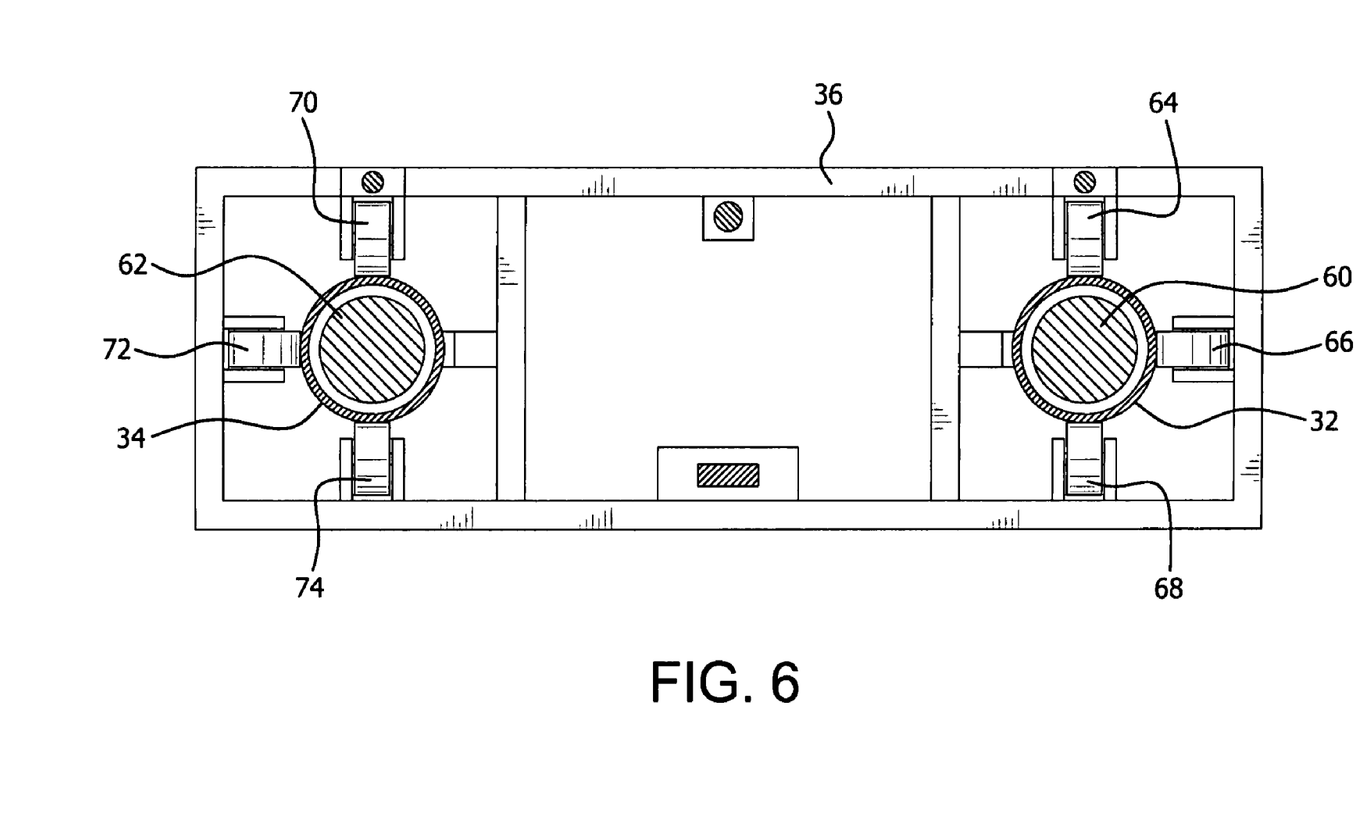
FIG. 6 is a modified top view of the vertical post/carriage component of the photo motion machine system of the present invention.

As best seen in FIGS. 2 and 5, chains, cables, or like lines 48 and 50 are connected at one of each of their respective exterior ends to carriage 36 via turnbuckles 52 and 54. Lines 48 and 50 extend around gear members or pulleys 56 and 58 and then into hollow posts 32 and 34, where each of their internal ends are secured to weights 60 and 62 within the posts. Weights 60 and 62 serve as counterweights, to maintain the vertical position of carriage 36 around posts 32 and 34. Thus, as carriage 36 moves up and down 36a, so too do the counterweights, e.g. 62 and 62a, shown in FIG. 5.

Elongated tubular member 76 is positioned within and is secured to carriage 36. Tubular member 76 extends between and is also secured to rear, bottom cross plate 78 and rear, top cross plate 80. These cross plates are secured between posts 32 and 34. Potentiometer 82 is connected to cross plate 78. Wiring emanating from potentiometer 82 limits the vertical movement of carriage 36. A second potentiometer 83 limits the aft position of platform 6. The potentiometers act as limit switches to prevent the carriage and platform from going too far down and back.

Figure 4:
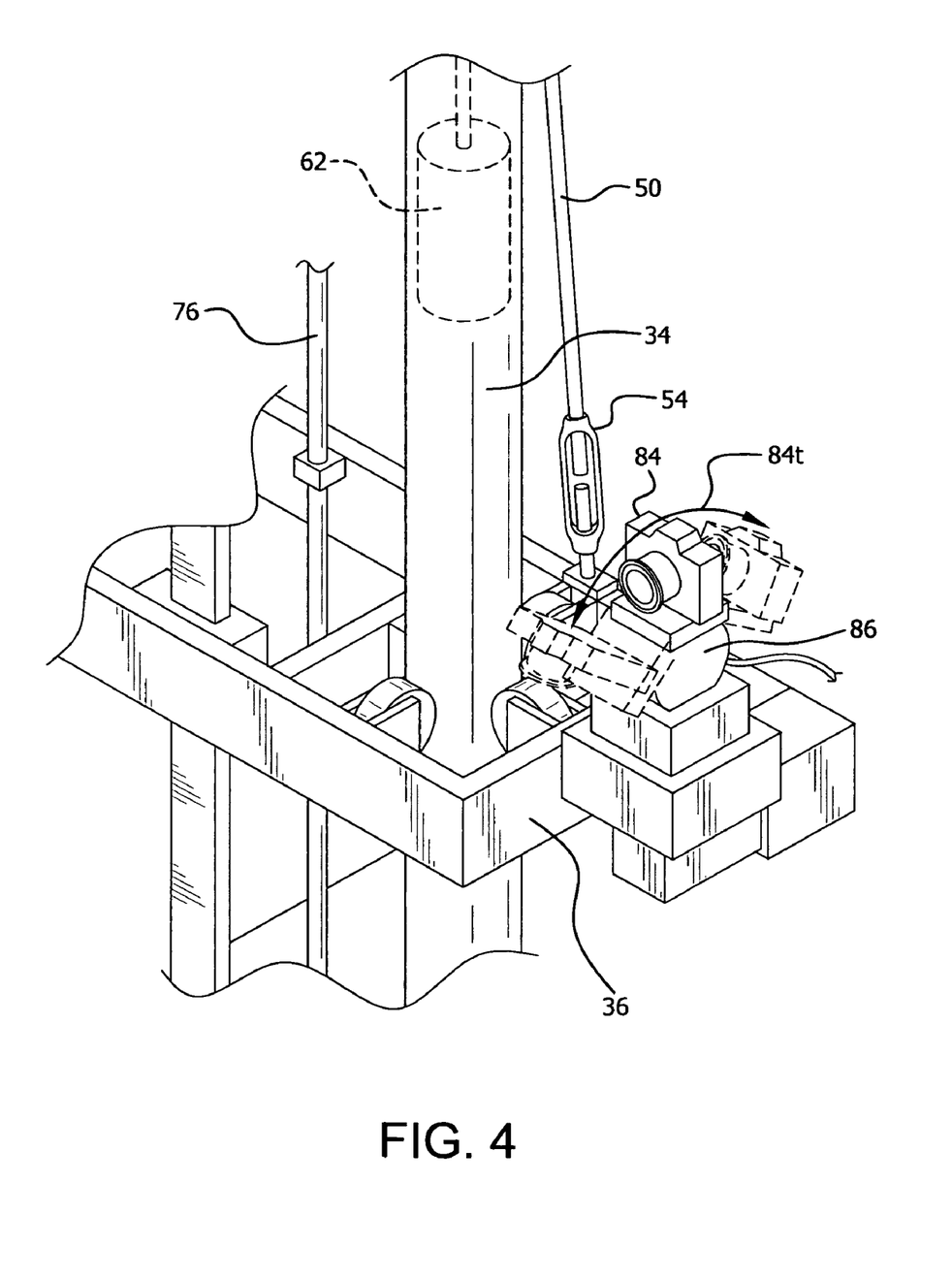
FIG. 4 is a partial perspective view of a portion of the photo motion machine system of the present invention.

Digital still photographic camera 84 is supported on tilting support 86 which is mounted on servo motor 88, itself mounted on cantilevered arm 90. Cantilevered arm 90 is connected to the exterior surface of carriage 36. Servo motor 88 provides the power to tilt support 86 up and down and thereby tilt camera 84 up and down. See FIG. 4.

Photo motion machine system 1 of the present invention also comprises turntable 4 operated by motor 92. The size of turntable 4 is variable, depending on the size of the object to be photographed. As shown in the drawings, turntable 4 is positioned in front of photo motion machine 2 on table or other raised supporting platform 94, over framework 16.

Master circuit control box 96, directed by specially designed software program configured into computer 98, coordinates and controls: the simultaneous movement of base member 6 through its motor 30 in a fore and aft direction 6a; carriage 36 vertically up and down along posts 32 and 34 by means of motor 40 and limits the vertical height of the carriage by means of potentiometer 82; and the up and down tilting of camera 84 by means of its servo motor 88. The software utilized in the system is designed to control the circuitry in master circuit control box 96, in order to position camera 84 along a designated arcuate route of travel, while turntable 4 simultaneously rotates. The software also controls the stoppage of motion of camera 84 at predetermined positions along its route of travel and directs it to take a still photograph at each predetermined position.

Thus, when the computer program is begun, so too is the coordinated movement of base member 6 forward and away from object 200, the up and down movement of carriage 36 in relation to the object, the tilting of camera 84 up and down in relation to photographed object, the taking of photographic images of the object with the camera, and the rotation of turntable 4. This simultaneous and coordinated movement of the turntable and the various components of photo motion machine, including camera 84, is controlled by the custom designed computer program run through the master circuit control box 96.

Operation of photo motion machine system 1 is as follows. Object 200 to be photographed is placed in the center of turntable 4. Carriage 36 of photo motion machine 2 is set at its lowest position on vertical posts 32 and 34, and placed perpendicular to and squarely facing object 200. The computer program is then initiated to begin the photo video animation process in four subroutines.

Figure 7:
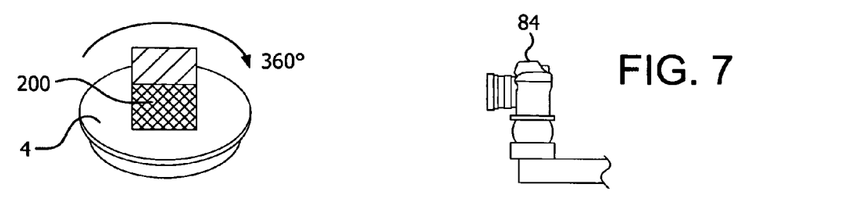
FIGS. 7-10 depict the operation of the photo motion machine system of the present invention.

As is depicted in FIG. 7, the first subroutine begins as camera 84 is directed to digitally photograph object 200 from its initial position, squarely facing the object. As turntable 4 rotates, camera 84 is actuated to take a digital photographic image at every 2.5 degree stop. This process continues until object 200 has rotated a full 360°. This first subroutine will result in 160 photographs.

Figure 8:
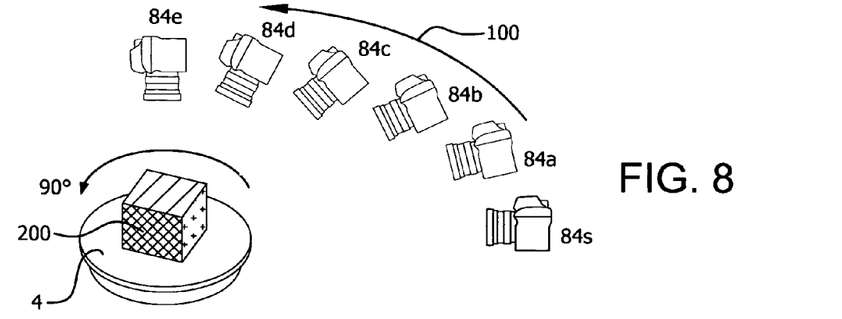

The second subroutine, depicted in FIG. 8, has photo motion machine 2 moving camera 84 forward and upward in arcuate route of travel 100 in relation to object 200, as turntable 4 rotates. To accomplish this during this second subroutine, the specifically designed computer software actuates motor 30 to move base member 6 forward, towards object 200, actuates motor 40 to move carriage 36 vertically up posts 32 and 34, and actuates servo motor 88 to slowly tilt camera 84 down towards the object. During arcuate route of travel 100, in which camera 84 starts at position 84s, the camera is programmed to stop at predetermined positions, e.g. 84a, 84b, 84c, 84d and 84e, along route of travel 100, taking a digital photographic image at each position. The result is that in this subroutine, photographic images are taken from a position in which camera 84 is squarely facing object 200 at 84s, to position 84e wherein the camera is directly over the object, all while turntable 4 rotates 90°. It has been found that camera 84 traveling along predetermined arcuate route of travel 100 will take approximately sixty-two photographic images for this subroutine.

Figure 9:
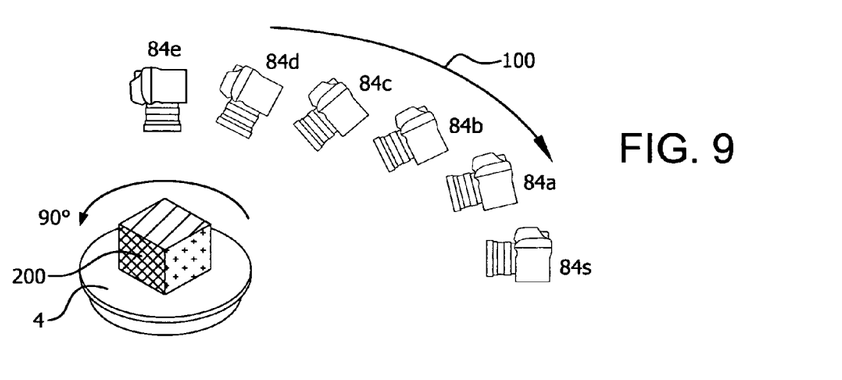

The third subroutine, depicted in FIG. 9, begins with photo motion machine 2 reversing direction, that is camera 84 travels the same arcuate route of travel 100 as in the second routine, but is moved down from predetermined position 84e directly above object 200, to its starting position 84s squarely facing the object. Once again, camera 84 is actuated to take a photographic image at predetermined positions, e.g. 84e, 84d, 84c, 84b, and 84a, along arcuate route of travel 100, all while turntable 4 continues to rotate the remaining 90°. This reverse, downward arcuate movement is the result of base member 6 moving away from object 200, carriage member 36 moving vertically downward along posts 32 and 34, and camera 84 being tilted upward in relation to the object. Subroutine three ends when camera 84 reaches its starting position 84s and its movements stops. It has been found that approximately sixty-one photographic images are sufficient for this subroutine.

Figure 10:
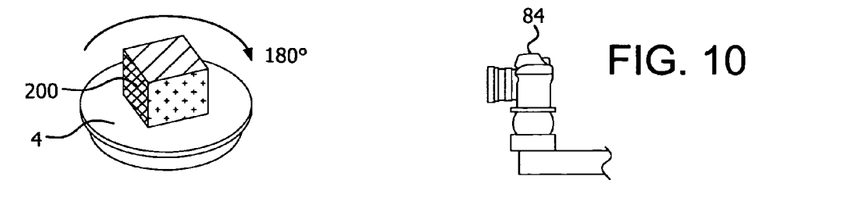

Subroutine four, depicted in FIG. 10, begins with turntable 4 reversing direction once again, thus proceeding in the original direction. Camera 84 is actuated to take photographic images, again at 2.5 degree stops, until the turntable 4 reaches its starting point. Approximately 122 photographic images are taken during the fourth subroutine.

It is particularly noted that the number of photographic images taken by photo motion machine 2 identified for each subroutine, successfully completes an animated video of the photographed object. However, the number of photographic images in each subroutine is not to be considered restricted to the referenced number of images. The computer program which directs the operation of photo motion machine 2 can be programmed to set camera 84 at greater or lesser predetermined positions, depending on the type and size of the object to be photographed.

Once all photographic images have been taken during the four subroutines, the images are downloaded from camera 84 and renamed in sequential order. The photographic images are then imported into Adobe Flash or like system and an animated, continuously running video showing complete circumferential and overhead views is created.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A photo motion machine for creating an animated video of changing views of an object, said machine comprising:
    camera means for taking still photographs of the object;
    first means for moving the camera means toward and away from the object;
    a carriage on which the camera means is mounted;
    column means for moveably supporting the carriage, the column means being hollow and extending upward from and being supported by the first means, said hollow column means extending completely through the carriage, the carriage circumscribing the hollow column means;
    means located within said hollow column means and being connected to the carriage for maintaining the position of the carriage in relation to said hollow column means;
    second means for tilting the camera toward and away from the object, whereby simultaneous movement of the camera means by the first means, the second means, and the carriage transports the camera means through an arcuate route of travel from a bottom position facing the object to an upper position directly over the object and back to the bottom position, said route of travel comprising a plurality of predetermined camera positions; and
    means for controlling the operation of the camera means and the first means, the second means, and the carriage whereby the controlling means directs the camera means to take a still photographic image of the object at each of the predetermined camera positions.

2. The photo motion machine as in claim 1 further comprising power means for operating the first means, the second means, and the carriage.

3. The photo motion machine as in claim 1 wherein the first means comprises a platform member with undermounted wheels.

4. The photo motion machine as in claim 1 wherein the second means comprises a pivotable camera mounted platform.

5. The photo motion machine as in claim 1 wherein the controlling means comprises computer operated software.

6. A photo motion machine for creating an animated video of changing views of an object, said machine comprising:
    a framework having a platform member, said platform member being moveable along the framework;
    camera means for taking still photos of the object;
    a carriage on which the camera means is mounted;
    column means for moveably supporting the carriage, the column means being hollow and extending upward from and being supported by the platform member on the framework, said hollow column means extending completely through the carriage, the carriage circumscribing the hollow column means;
    means located within said hollow column means and being connected to the carriage for maintaining the position of the carriage in relation to said hollow column means;
    power means for moving the carriage vertically along the column means and up and down in relation to the object, for moving the platform member toward and away from the object, and for tilting the camera up and down in relation to the object, whereby the power means simultaneously moves the camera, the carriage, and the platform member through an arcuate route of travel from a bottom position facing the object, to an upper position directly over the object and back to the bottom position, said route of travel comprising a plurality of predetermined camera means positions; and
    means for controlling the operation of the camera means and the power means, whereby the controlling means directs the camera means to take a still photographic image of the object at each of the predetermined camera positions.

7. The photo motion machine as in claim 6 wherein the platform member comprises undermounted wheels.

8. The photo motion machine as in claim 6 further comprising a pivotable platform located on the carriage, said camera means being mounted on the pivotable platform.

9. The photo motion machine as in claim 6 wherein the controlling means comprises computer operated software.

10. The photo motion machine as in claim 6 wherein the means for maintaining the position of the carriage comprises at least one weight located within the said hollow column means and lines connecting the weight to the carriage.

11. The photo motion machine as in claim 10 wherein the hollow column means comprises dual hollow posts extending upward from and supported by the platform member.

12. The photo motion machine as in claim 11 wherein each hollow post encompasses a weight connected by lines to the carriage.

13. The photo motion machine as in claim 1 wherein the means for maintaining the vertical position of the carriage comprises at least one weight located within the said hollow column means and lines connecting the weight to the carriage.

14. The photo motion machine as in claim 13 wherein the hollow column means comprises dual hollow posts extending upward from and supported by the platform member.

15. The photo motion machine as in claim 14 wherein each hollow post encompasses a weight connected by lines to the carriage.

* * * * *